United States Patent
Phillippe

(10) Patent No.: US 11,824,941 B2
(45) Date of Patent: Nov. 21, 2023

(54) ACCESSING REPRESENTATIONAL STATE TRANSFER APPLICATION PROGRAMMING INTERFACES USING SIMPLE MAIL TRANSFER PROTOCOL

(71) Applicant: Oracle International Corporation, Redwood Shores, CA (US)

(72) Inventor: Bryan James Phillippe, Fall City, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/560,126

(22) Filed: Dec. 22, 2021

(65) Prior Publication Data

US 2023/0199071 A1 Jun. 22, 2023

(51) Int. Cl.
*H04L 67/133* (2022.01)
*H04L 51/18* (2022.01)
*H04L 51/214* (2022.01)
*H04L 67/01* (2022.01)

(52) U.S. Cl.
CPC ............ *H04L 67/133* (2022.05); *H04L 51/18* (2013.01); *H04L 51/214* (2022.05); *H04L 67/01* (2022.05)

(58) Field of Classification Search
CPC ..... H04L 67/133; H04L 51/18; H04L 51/214; H04L 67/01
See application file for complete search history.

(56) References Cited

U.S. PATENT DOCUMENTS

| | | | |
|---|---|---|---|
| 8,934,925 B2* | 1/2015 | Jeyaseelan | H04L 51/02 455/412.2 |
| 10,057,734 B2* | 8/2018 | Wilsher | H04L 65/762 |
| 11,132,647 B1* | 9/2021 | Shah | H04L 51/212 |
| 2013/0157699 A1* | 6/2013 | Talwar | H04L 51/58 709/204 |
| 2015/0026455 A1* | 1/2015 | Enderwick | H04L 63/08 713/153 |
| 2018/0173772 A1* | 6/2018 | Anantha | G06F 16/248 |
| 2021/0294486 A1* | 9/2021 | Kulkarni | H04L 51/42 |

FOREIGN PATENT DOCUMENTS

CN 102902572 B * 6/2015

* cited by examiner

*Primary Examiner* — Joe Chacko
(74) *Attorney, Agent, or Firm* — Kilpatrick Townsend & Stockton LLP

(57) ABSTRACT

A Representational State Transfer (REST)-Simple Message Transfer Protocol (SMTP) protocol gateway (RSPG) is disclosed that includes capabilities for accessing and processing REST Application Programming Interfaces (APIs) using SMTP. The RSPG receives a first email message, extracts information from the received first email message and constructs a REST API call based on the extracted information. The RSPG invokes the REST API call against a REST endpoint and receives a response generated from execution of the REST API call. The RSPG generates a second email message based on the response and causes the second email message to be communicated to an intended recipient of the response of the REST API call.

20 Claims, 10 Drawing Sheets

ACCESSING REPRESENTATIONAL STATE TRANSFER APPLICATION PROGRAMMING INTERFACES USING SIMPLE MAIL TRANSFER PROTOCOL

BACKGROUND

A Representational State Transfer (REST) Application Programming Interface (API) (also known as a RESTful API) is a type of API that enables users to interact with web services to access and retrieve resources. Traditionally, a REST API uses Hyper Text Transfer Protocol (HTTP) operations to access and retrieve data. A number of proprietary solutions (e.g., REST clients) currently exist that facilitate the access and execution of REST APIs using HTTP operations such as read, update, create and delete operations. However these solutions typically have to contend with the inherent deficiencies of HTTP, such as requiring synchronous and directed (unicast) transactions, as well as a custom client to compose and process a request and response to and from a destination endpoint. There is thus a need for making the processing and execution of REST APIs more flexible than is possible in existing implementations.

BRIEF SUMMARY

The present disclosure relates to techniques for accessing and processing Representational State Transfer (REST) Application Programming Interfaces (APIs) using Simple Message Transfer Protocol (SMTP). More particularly, the present disclosure relates to a REST-SMTP protocol gateway (RSPG) that includes capabilities for receiving an email message composed according to SMTP semantics, converting the email message into a traditional REST API call for execution at an endpoint, representing the results of execution of the REST API call using SMTP semantics and transmitting the results of execution to a sender or to alternative recipients of the email message.

In certain embodiments, an RSPG is disclosed. The RSPG extracts information from one or more data fields of a first email message and constructs a REST API call based on the extracted information. The RSPG invokes the REST API call against a REST endpoint and receives a response generated from execution of the REST API call. The RSPG generates a second email message based on the response and causes the second email message to be communicated to an intended recipient of the response of the REST API call.

In certain examples, the RSPG is configured to extract information from a To field of the first email message. Extracting information from the To field comprises extracting information identifying the REST endpoint from a Username portion of the To field of the first email message. Extracting information from the To field further comprises extracting information identifying the RSPG for accepting the first email message from a Domain Name portion of the To field of the first email message.

In certain examples, the RSPG is configured to extract information from a Subject field of the first email message. Extracting information from the Subject field comprises extracting information identifying an action to be performed by the REST API call and extracting information identifying a pathname that uniquely identifies a resource to be accessed by the REST API call at the REST endpoint.

In certain examples, the RSPG is configured to extract additional information identifying the action to be performed by the REST API call from the body of the email message.

In certain examples, the response generated from execution of the REST API call comprises a response status code indicating that the REST API call was successfully executed by the REST endpoint. In certain examples, the response generated from execution of the REST API call comprises a response status code indicating that the REST API call failed to successfully execute at the REST endpoint. In certain examples, the response generated from execution of the REST API call comprises an intermediate response status code indicating that the REST API call is still being processed.

In certain examples, the RSPG is configured to determine that the response was not received from execution of the REST API call by the REST endpoint within a threshold period of time and responsive to the determining, the RSPG is configured to re-invoke the REST API call to the REST endpoint. In certain examples, the RSPG is configured to re-invoke the REST API call until a threshold condition is met or until the response is received from the REST endpoint.

In certain examples, the RSPG is configured to determine that the response received from the REST endpoint indicates unavailability of the REST endpoint and responsive to the determining is configured to re-invoke the REST API call against the REST endpoint.

Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the Detailed Description, and further description is provided there.

BRIEF DESCRIPTION

Features, embodiments, and advantages of the present disclosure are better understood when the following Detailed Description is read with reference to the accompanying drawings.

DETAILED DESCRIPTION

Figure 1:
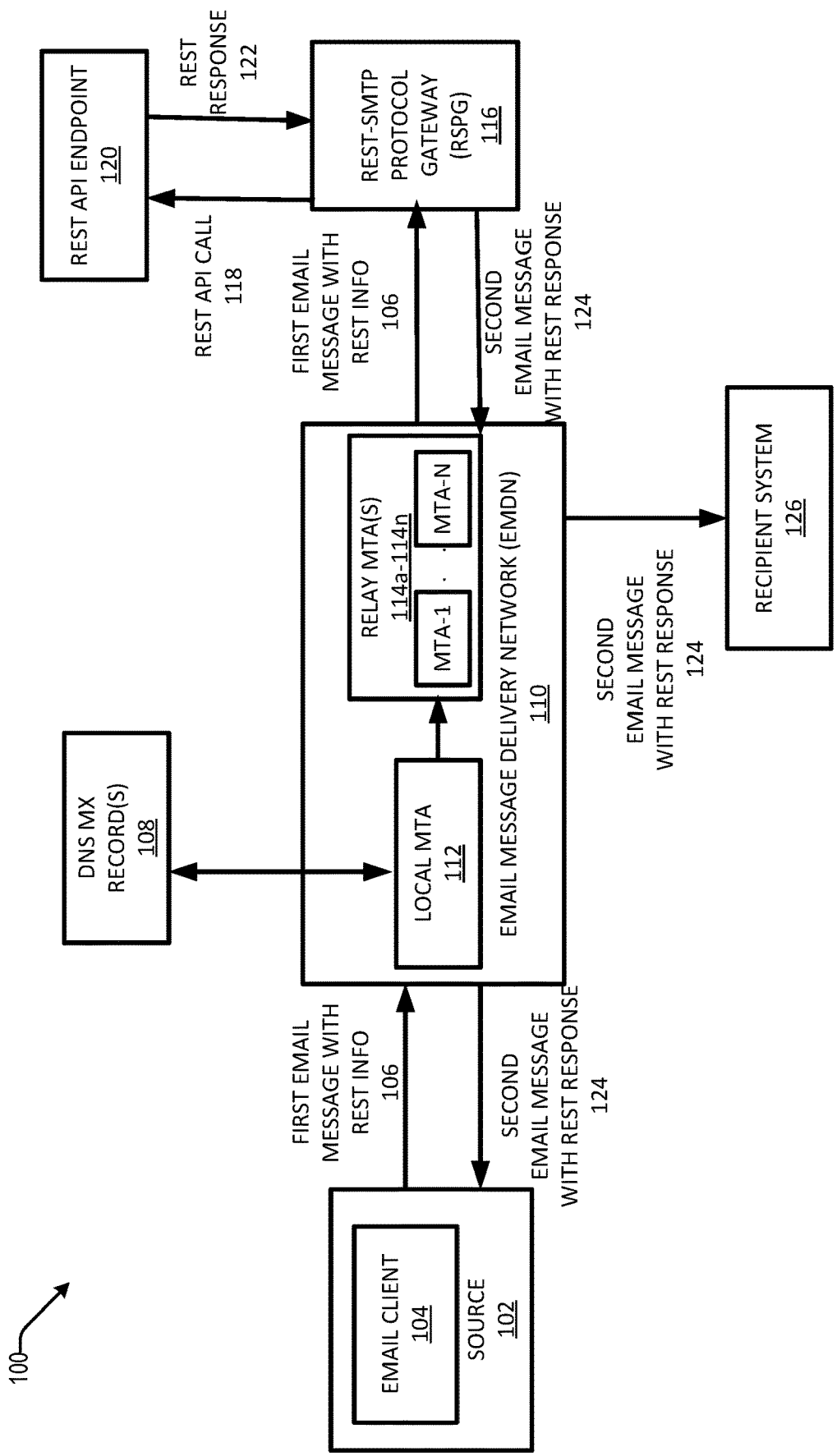
FIG. 1 depicts a REST-SMTP protocol gateway that includes capabilities for accessing and processing REST APIs using SMTP semantics, according to certain embodiments.

The present disclosure relates to techniques for accessing and processing REST APIs using SMTP. More particularly, the present disclosure relates to a REST-SMTP protocol gateway (RSPG) that includes capabilities for receiving an email message composed according to SMTP semantics, converting the email message into a traditional REST API call for execution at an endpoint, representing the results of execution of the REST API call using SMTP semantics and transmitting the results of execution to a sender or to alternative recipients of the email message.

In certain embodiments, the RSPG is implemented as a REST-aware SMTP relay Message Transfer Agent (MTA) that is configured to receive, queue and process email messages according to a standard message delivery protocol (e.g., SMTP) used for communicating email messages to their intended recipients. By way of example, the RSPG may represent a target mail server (i.e., an MTA) responsible for accepting an email message composed using an email client application and delivered via a cloud-based email delivery service. The cloud-based email delivery service may represent an email message distribution network (EMDN) that provides a fast and reliable managed solution for sending a high-volume of emails to be delivered to a set of intended recipients. The EMDN may comprise a set of Message Transfer Agents (MTAs) that are configured to receive email messages from various senders (e.g., tenants or customers) of the email delivery service and deliver the email messages to their intended recipients.

In certain embodiments, the RSPG receives an email message from the EMDN, converts the email message composed using SMTP semantics into a Hyper Text Transfer Protocol (HTTP) REST API call by extracting information from one or more data fields of the email message and constructs a REST API call based on the extracted information. The RSPG then invokes the REST API call against a local or remote REST endpoint and obtains a result/response as a result of execution of the REST API call from the REST endpoint. The RSPG returns the response as an email message to a user associated with the sender of the email message or to alternative recipients of the email message using SMTP semantics.

In certain examples, the response received from the REST endpoint may indicate that the REST API call was successfully executed at the endpoint. In other examples, the response received from the REST endpoint may indicate that the REST API call failed to execute successfully. In some examples, the response received from the REST endpoint may indicate that the REST API call is still being executed and has not yet completed execution at the endpoint. For instance, certain REST API operations (e.g., starting up a computing resource such as a virtual machine at the endpoint) may take a considerable amount of time to complete execution at the endpoint. In such cases, the endpoint may be configured to periodically return intermediate responses to the RSPG 116 which may, in turn, transmit the responses asynchronously as email messages to the sender (or alternative recipient(s)) using SMTP semantics. The intermediate response may include an intermediate result value in the body of the email message that the user can use to subsequently poll the endpoint for an update regarding the execution of the REST API call. For instance, the user may send a follow up email message to obtain an update regarding the current status of execution of the REST API call using the intermediate result value. Thus, the RSPG described in the present disclosure provides several technical advancements and/or improvements over conventional REST clients that do not traditionally support asynchronous calling mechanisms.

In certain embodiments, the RSPG may be configured with re-try capabilities to automatically re-invoke a REST API call against a REST endpoint when the RSPG does not receive a response from the endpoint within a certain threshold period of time or if the RSPG receives an error response from the endpoint indicating unavailability of the endpoint. By leveraging the native re-try capabilities provided by SMTP delivery semantics, the RSPG is able to increase the reliability of execution of REST calls. After re-invoking the REST API call a certain number of times, if no response is received from the endpoint, the RSPG includes capabilities to generate an email message indicating that no response was received and returns the email message to a user associated with the sender of the email message or to alternative recipients of the email message using SMTP semantics.

The RSPG described in the present disclosure additionally provides several technical advancements and/or improvements over conventional REST clients configured to execute REST API transactions against a REST endpoint. For instance, in certain embodiments, the RSPG may be configured with capabilities to direct a REST API call to multiple different endpoints by extracting information identifying the different endpoints from a data field (for e.g., a recipient field) of an email message composed using standard email addressing semantics. The RSPG is then configured to construct a REST API call directed to each endpoint using the extracted information and simultaneously deliver the REST API call to each of the target endpoints. Instead of a user having to compose individual REST API calls directed to multiple different endpoints using a traditional REST client, by using the new and improved architecture provided by the RSPG, a user now needs to only compose a single email message using SMTP semantics that is directed to multiple recipients. The RSPG can then translate the email message into individual REST calls to be simultaneously delivered to the identified endpoints. This results in more efficient utilization of computing resources for performing REST transactions.

In addition, by using the RSPG described in the present disclosure, an email message identifying REST related information that is composed using SMTP semantics can be transmitted across multiple hops (e.g., via multiple Relay MTAs) provided by an underlying message distribution network (e.g., EMDN) without having to be encrypted or decrypted at each hop, even if the SMTP message body is encrypted at one end. In contrast, a REST API call that is accessed using a traditional REST client that has to go through multiple proxy servers (i.e., multiple hops) prior to reaching its destination has to be encrypted and decrypted at each hop. This requires the REST APIs typically to have extended HTTP usage headers to include numerous custom headers and other functionality which makes leveraging the APIs directly from a REST client additionally challenging.

Referring now to the drawings, FIG. 1 depicts a REST-SMTP protocol gateway that includes capabilities for accessing and processing REST APIs using SMTP semantics, according to certain embodiments. The computing environment 100 may be implemented by one or more computing systems that execute computer-readable instructions (e.g., code, program) to implement the computing environment 100. As depicted in FIG. 1, the computing environment 100 includes various systems and subsystems including a source 102, an EMDN 110 and a REST-SMTP protocol gateway 116 (referred to herein as a RSPG). The systems and subsystems depicted in FIG. 1 may be implemented using software (e.g., code, instructions, program) executed by one or more processing units (e.g., processors, cores) of a computing system, hardware, or combinations thereof. The software may be stored on a non-transitory storage medium (e.g., on a memory device).

The computing environment 100 comprising the EMDN 110 and the RSPG 116 may be implemented in various different configurations. In certain embodiments, the EMDN 110 and the RSPG 116 may be implemented on one or more servers of a cloud provider network and their services for processing and executing REST API calls may be provided to subscribers of cloud services on a subscription basis. Computing environment 100 depicted in FIG. 1 is merely an example and is not intended to unduly limit the scope of claimed embodiments. One of ordinary skill in the art would recognize many possible variations, alternatives, and modifications. For example, in some implementations, the EMDN 110 and the RSPG-MTA 116 can be implemented using more or fewer subsystems than those shown in FIG. 1, may combine two or more subsystems, or may have a different configuration or arrangement of subsystems.

In a certain implementation, the RSPG 116 represents a REST-aware SMTP relay Message Transfer Agent (MTA) and is used as a target mail server for accepting email messages generated by an email client application and delivered using SMTP semantics provided by the EMDN 110. The RSPG 116 receives an email message via the EMDN 102 and translates the email message into a synchronous REST API call. The translation involves extracting, by the RSPG 116, information from one or more data fields of the email message and constructing a REST API call based on the extracted information. The RSPG 116 invokes the REST API call against a REST API endpoint 120 and obtains a result/response as a result of the execution of the REST API call from the REST endpoint. The RSPG 116 is then configured to return the response as an email message reply to the sender of the email message or to alternative recipients of the email message using standard SMTP semantics.

Figure 5:
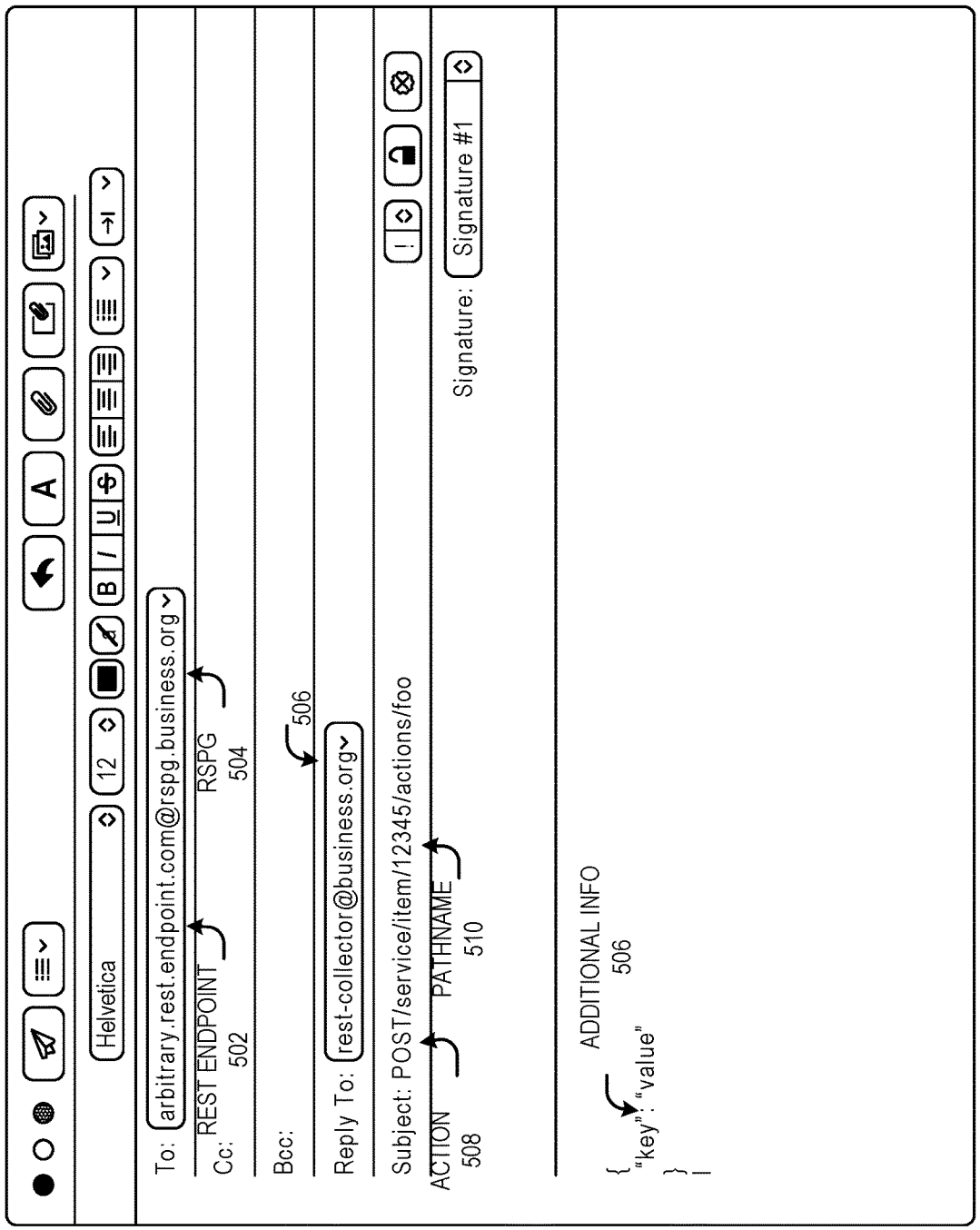
FIG. 5 illustrates an example of an email message composed using REST information, according to certain embodiments.

In the embodiment depicted in FIG. 1, a first email message 106 with REST information may be generated by a source 102. The source 102 may represent a system of an entity such as a customer or tenant (e.g., an organization, an enterprise, or an individual) of the cloud service provider who subscribes to the services provided by the EMDN 110 and the RSPG 116 for processing and executing REST API calls using SMTP semantics. In certain examples, the source 102 may represent a system (i.e., a user device) that is communicatively coupled to the EMDN 110 possibly via a public network (e.g., the Internet). The user device may be of various types, including but not limited to, a mobile phone, a tablet, a desktop computer, and the like. For instance, a user (e.g., an end user, a business owner, or a marketing officer associated with the source 102) may interact with the EMDN 102 using a user interface (UI) (which may be a graphical user interface (GUI)) of an application executed by the user device. The application may be an email client application 104 (e.g., a mail user agent (MUA)) installed in the device to enable the user to compose an email message. FIG. 5 illustrates an example of an email message composed using REST information, according to certain embodiments. In certain examples, the mail user agent (MUA) may format the email message in a suitable format prior to submission to the EMDN 110 and utilize a submission protocol (e.g., SMTP) to transmit the message to the EMDN 102. In certain examples, the first email message 106 may be automatically composed using software (e.g., code, instructions, program) implemented by the client application 104 without requiring user interaction and the client application may be configured to automatically send the first email message to the EMDN 102.

The first email message 106 is received by a local MTA 112 in the EMDN 102 which then performs a Domain Name Server (DNS) Mail Exchanger (MX) record 108 resolution to identify the mail server (for e.g., a relay MTA-1 114a) that is responsible for accepting email messages on behalf of the domain name of the recipient of the email message. The local MTA 112 provides the email message via a message delivery protocol (e.g., SMTP) to the indicated relay MTA (e.g., 114a). The relay MTA 114a has no knowledge of any REST behavior, but just forwards the email message as it would any other email message to another relay MTA (e.g., 114b) which may then relay the email message along across several other relay MTA "hops" (any or all of which may be unaware of the eventual RSPG 116) to the RSPG 116 based on email routing rules at the destination MTAs.

The RSPG 116 may be configured to receive and queue email messages according to the standard SMTP exchange protocol. For example, the RSPG 116 may select an email message (e.g., the first email message 106) which may be stored at the head of its message queue for processing and extract information from one or more data fields of the first email message. Based on the extracted information, the RSPG 116 then constructs a REST API call. In certain examples, the RSPG 116 may be configured to process the information in additional email headers of the email message (if present) to handle factors such as user authentication. The RSPG 116 then invokes the REST API call against a local or remote REST API endpoint 120 and receives a response generated from execution of the REST API call from the REST API endpoint. The REST API endpoint 120 has no knowledge of any SMTP behavior, but just processes the REST API transaction as it would any other REST action and transmits a response as a result of executing the REST API call to the RSPG 116. The RSPG 16 encapsulates the response/result into an email message reply (i.e., a second email message 124 with the REST response), and forwards the response back to the intended recipients of the email message. The response (i.e., in the form of an email message reply) from the REST exchange may be stored in a recipient system 126 for later review by the recipient or the response may be transmitted back to the user associated with the source 102. The recipient system 126 may represent an email service (inbox) provider (e.g., Gmail®, Yahoo®, Microsoft® and so on) of the recipient of the email message.

Figure 2:
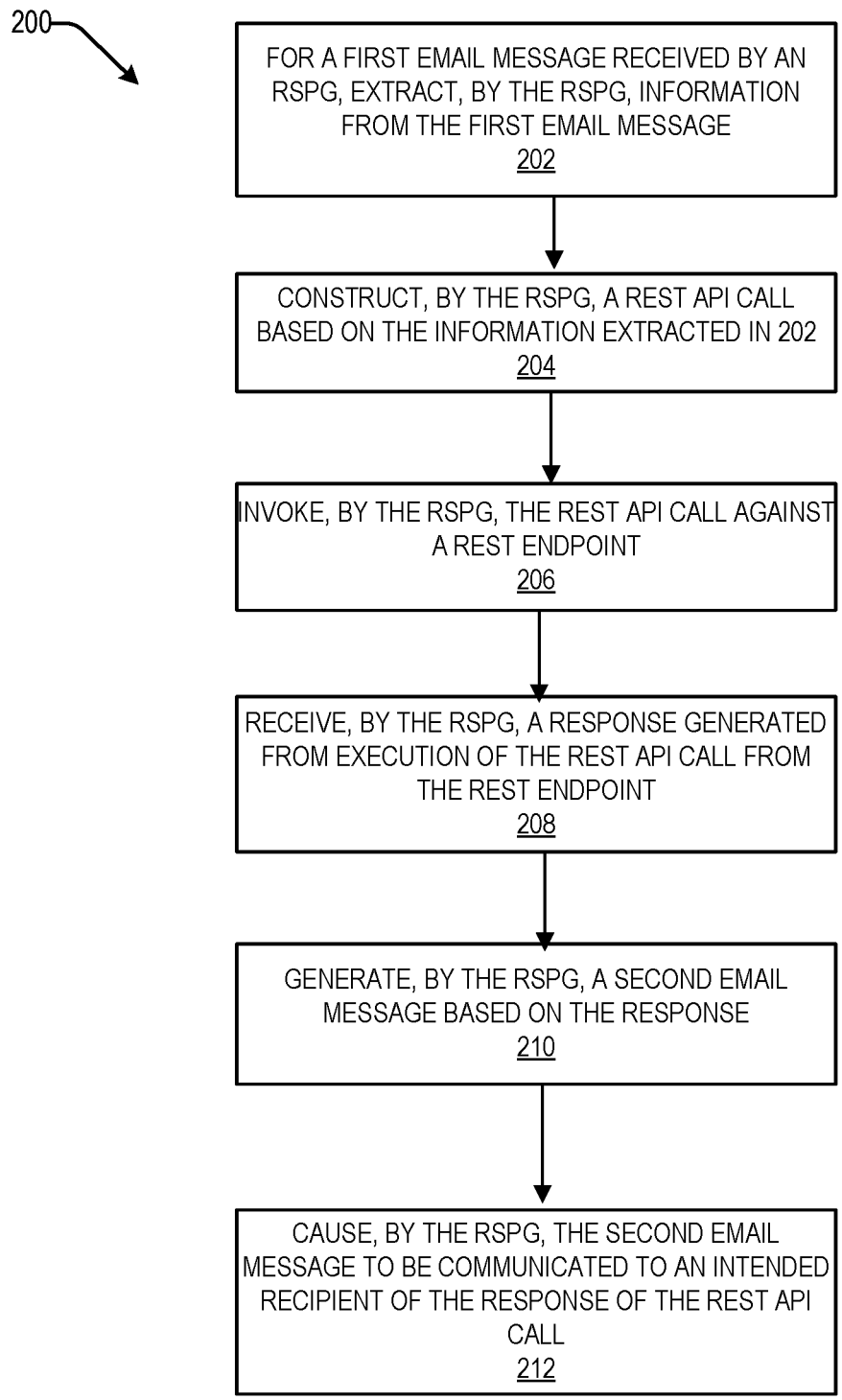
FIG. 2 depicts an example of a process performed by the RSPG for accessing and processing REST APIs using SMTP semantics, according to certain embodiments.

FIG. 2 depicts an example of a process 200 performed by the RSPG for accessing and processing REST APIs using SMTP semantics, according to certain embodiments. The processing depicted in FIG. 2 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 200 presented in FIG. 2 and described below is intended to be illustrative and non-limiting. Although FIG. 2 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 2 may be performed by the RSPG 116.

The processing depicted in FIG. 2 may be initiated when, at block 202, the RSPG 116 receives a first email message from the EMDN (e.g., from a relay MTA 114n) and extracts information from the first email message. In certain examples, the processing at block 202 may include extracting, by the RSPG 116, information related to a REST API call from one or more data fields of the first email message. Additional details of the processing performed by the RSPG 116 to extract information from the data fields of the first email message is described in detail in FIG. 4.

At block 204, the RSPG 116 constructs a REST API call based on the information extracted in 202. For instance, based on the information extracted from the data fields of the email message, the RSPG 116 may construct a REST API call that comprises a "POST" action to create a resource at the endpoint.

At block 206, the RSPG 116 invokes the REST API call against a REST endpoint 120. In certain examples the RSPG 116 is configured to invoke a standard HTTP REST API call to the specified REST endpoint based on the information extracted in block 202.

At block 208, the RSPG 116 receives a response generated from the execution of the REST API call from the REST endpoint 120. In certain examples, the response received from the REST endpoint may indicate that the REST API call was successfully executed at the endpoint. In this case, the response received from the REST endpoint may include a response status code (e.g., a HTTP standard response code 200) indicating that the REST API call was successfully executed and an actual result (for e.g., a resource accessed or created at the endpoint) based on execution of the REST API call. In certain examples, the response received from the REST endpoint may indicate that the REST API call failed to execute successfully. For instance, the REST API call may fail to execute because of an error caused by the sender of the email message while composing an email message comprising REST information that is to be translated into a REST API call by the RSPG 116. In this case, the response received from the REST endpoint may include a response status code (e.g., a HTTP standard response code 500) indicating that the REST API call failed to execute and an error message generated from execution of the REST API call.

In certain embodiments, the response received from the REST endpoint may indicate that the REST API call is still being executed and has not yet completed execution. For instance, certain operations (e.g., starting up a virtual machine at the endpoint) executed by a REST call may take a considerable amount of time to complete execution at the endpoint. In such cases, the RSPG 116 typically cannot keep a connection open to the endpoint until a response is obtained from the endpoint. In this case, the endpoint may be configured to periodically return an intermediate response status code (e.g., 201) comprising an intermediate result acknowledging that the REST API call has been received for processing but has not yet completed execution to the RSPG 116. The RSPG 116 may, in turn, transmit the intermediate responses asynchronously as email messages to the sender (or alternative recipient(s)) using SMTP semantics. The intermediate response may include an intermediate result value in the body of the email message that the user can use to subsequently poll the endpoint for an update regarding the current status of execution of the REST API call. For instance, the user may send a follow up email message to obtain an update regarding the execution of the REST API call using the intermediate result value.

At block 210, the RSPG 116 recomposes the information (i.e., response code and result) into an SMTP-compliant email (a second email message directed back to the sender (or an alternative supplied in the Reply To field).

At block 212, the RSPG 116 causes the second email message to be communicated to an intended recipient of the response of the REST API call.

In certain embodiments, at block 208, the RSPG 116 may not receive a response from the REST endpoint (e.g., due to unavailability of the endpoint). In this case, the RSPG 116 may be configured to automatically re-invoke the REST API call against the endpoint a certain number of times until it receives a response back from the REST endpoint or until a threshold condition is satisfied. Thus, in certain implementations, the RSPG 116 may be configured with capabilities to increase the reliability of execution of REST calls by leveraging the native re-trying capability provided by the underlying SMTP framework of the MTA to re-execute a REST API call multiple times until it receives a response back from the REST endpoint or until a threshold condition is satisfied.

Figure 3:
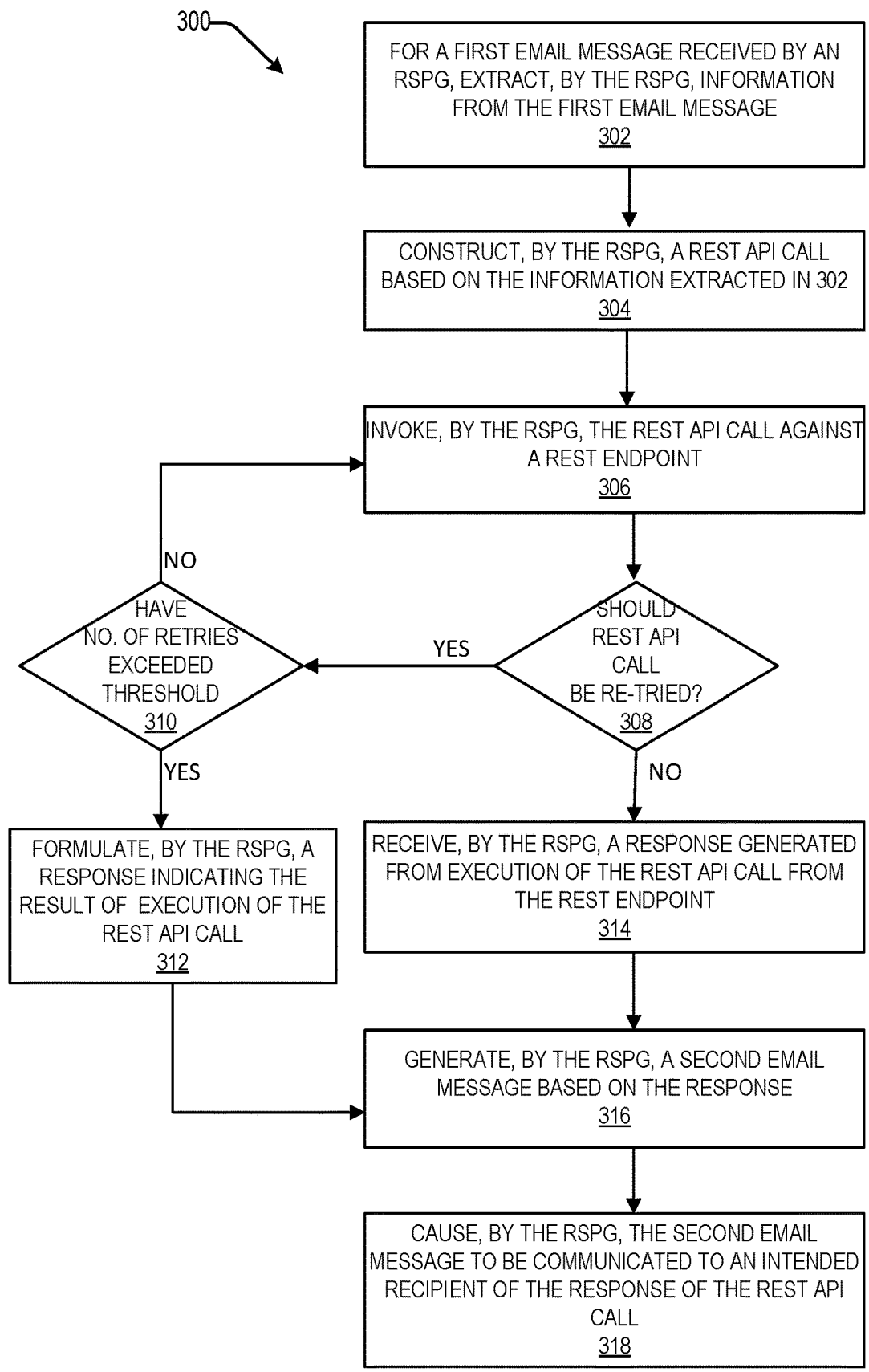
FIG. 3 depicts an example of a process implemented by the RSPG for re-invoking a REST API call against a REST endpoint, according to certain embodiments.

FIG. 3 depicts an example of a process 300 implemented by the RSPG for re-invoking a REST API call against a REST endpoint, according to certain embodiments. The processing depicted in FIG. 3 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 300 presented in FIG. 3 and described below is intended to be illustrative and non-limiting. Although FIG. 3 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 3 may be performed by the RSPG 116.

The processing depicted in blocks 302-306 in FIG. 3 is similar to the processing performed by the RSPG 116 in blocks 202-206 of FIG. 2. For instance, at block 302, the RSPG 116 receives a first email message from the EMDN (e.g., from a relay MTA 114n) and extracts information from the first email message. In certain examples, the processing at block 302 may include extracting, by the RSPG 116, information related to a REST API call from one or more data fields of the first email message. At block 304, the RSPG 116 constructs a REST API call based on the information extracted in 302 and at block 306, the RSPG 116 invokes the REST API call against a REST endpoint 120.

At block 308, the RSPG 116 determines if the REST API call should be re-tried. For instance, the RSPG 116 may determine that the REST API call should be re-tried when the RSPG 116 does not get a response back from the endpoint within a certain threshold period of time or if the RSPG 116 or gets an error code back from the endpoint indicating unavailability of the endpoint.

If the RSPG 116 determines that the REST API call should be re-tried, then, at block 310, the RSPG 116 determines if the number of re-tries have exceeded a certain threshold value. The threshold value may be configured by a user of the RSPG 116 at the time of configuring the RSPG 116 for accessing and processing REST API calls using SMTP semantics. If the number of re-tries have not exceeded the threshold value, the RSPG 116 automatically re-invokes the REST API call against the REST endpoint. If the number of re-tries have exceeded the threshold value, then at block 312, the RSPG formulates a response indicating the result of execution of the REST API call and at block 316 generates a second email message based on the response. For instance, the response may be formulated by the RSPG 116 into an SMTP-compliant email (a second email message directed back to the sender (or an alternative recipient supplied in the Reply To field) indicating that the REST API call could not be successfully executed.

If at block 308, the RSPG 116 determines that the REST API call was successfully executed (i.e., it does not have to be re-tried), then, at block 314, the RSPG receives a response generated from the execution of the REST API call from the REST endpoint and at block 216 and formulates the response into a second email message to be directed back to the sender, i.e., the intended recipient (or an alternative recipient supplied in the Reply To field). At block 318, the RSPG causes the second email message to be communicated to an intended recipient of the response of the REST API call.

Figure 4:
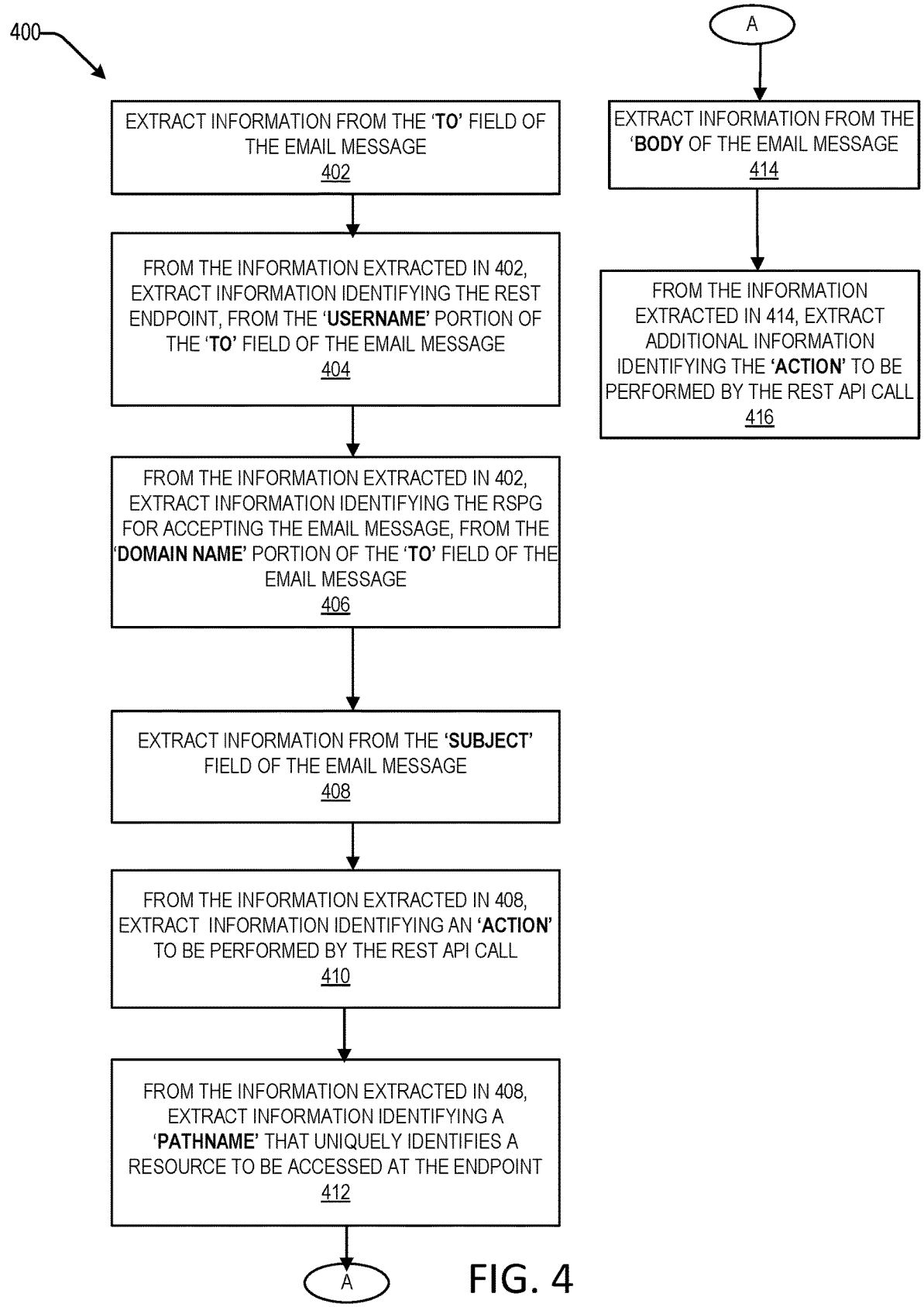
FIG. 4 depicts an example of a process performed by the RSPG shown in FIG. 1 for extracting information related to a REST API call from one or more data fields of an email message, according to certain embodiments.

FIG. 4 depicts an example of a process 400 performed by the RSPG shown in FIG. 1 for extracting information related to a REST API call from one or more data fields of an email message, according to certain embodiments. The processing depicted in FIG. 4 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 400 presented in FIG. 4 and described below is intended to be illustrative and non-limiting. Although FIG. 4 depicts the various processing steps occurring in a particular sequence or order, this is not intended to be limiting. In certain alternative embodiments, the steps may be performed in some different order or some steps may also be performed in parallel. In certain embodiments, the processing depicted in FIG. 4 may be performed by the RSPG 116 and depicts additional details of the processing performed by the RSPG 116 in block 202 shown in FIG. 2 or in block 302 shown in FIG. 3.

The processing depicted in FIG. 4 is described in relation to an example email message that is composed by a user associated with the source 102 and received for processing by the RSPG 116 from a relay MTA (e.g., 114*n*) in the EMDN 110. FIG. 5 illustrates an example of an email message comprising REST information, according to certain embodiments. In the example shown in FIG. 5, the email message comprises multiple fields, such as a "To" field that identifies the intended recipient of the email message, a "Reply To" field 506 that identifies alternate recipients of the email message other than the "FROM" email address used by the sender to send the email message, the "Subject" field identifies the subject of the email message and the "Body" field identifies additional contents of the email message.

The processing depicted in FIG. 4 is initiated when the RSPG 116 receives an email message (e.g., a first email message) for processing. At block 402, the RSPG 116 extracts information from the "To" field of the email message.

At block 404, from the information extracted from the "To" field of the email message in 402, the RSPG 116 extracts information identifying the REST endpoint to call from the "Username" portion 502 of the "To" field of the email message. In the example shown in FIG. 5, the "Username" portion of the "To" field is "arbitrary.rest.endpoint.com" and identifies the REST endpoint to call.

At block 406, from the information extracted from the "To" field of the email message in 402, the RSPG 116 extracts information identifying the mail server (i.e., RSPG 116) for accepting the email message from the "Domain Name" portion 504 of the "To" field of the email message. For example, as shown in FIG. 5, the "Domain Name" "rspg.business.org" identifies the RSPG for accepting the email message. The Domain Name (i.e., the hostname) portion is subject to traditional SMTP MX record and MTA routing, through which the email message will eventually be delivered to the RSPG MTA at which point the username portion of the email will be processed by the RSPG-MTA to determine which REST endpoint to call.

At block 408, the RSPG 116 extracts information from the "Subject" field of the email message. For the example shown in FIG. 5, this information may include the REST action verb (e.g., POST) and a pathname (e.g., service/item/12345/actions/foo) that uniquely identifies a resource to be accessed by the REST API call at the REST endpoint.

At block 410, from the information extracted in 408, the RSPG 116 extracts information identifying an "action" 508 to be performed by the REST API call. For the example shown in FIG. 5, the action is a "POST" action used to create a resource as a result of execution of the REST API call at the endpoint.

At block 412, from the information extracted in 408, the RSPG 116 extracts information identifying a pathname 510 (e.g., service/item/12345/actions/foo) that uniquely identifies a resource to be accessed by the REST API call at the REST endpoint.

At block 414, the RSPG 116 extracts information from the body of the email message. At block 416, from the information extracted in 414, the RSPG 116 extracts additional information 506 identifying the "action" to be performed by the REST API call. For instance, in the example shown in FIG. 5, the additional information may include a "key-value" pair associated with the action to be performed. The key-value pair identifies a key (which is a unique identifier for some item of data) and a value (which is either the data that is identified or a pointer to the location of that data) associated with a resource to be accessed by the REST API call at the REST endpoint. In certain examples, the body of the email message can be encrypted, and the RSPG 116 may be configured to store the private key necessary to decrypt it (e.g. using Public Key Infrastructure (PKI)). This allows for the secure relay of the encrypted body REST contents and response, whereby the RSPG 116 is configured to encrypt the response using the public key for the destination recipients, using, for example, public key servers (tools) designed to secure your communications and encrypt files (e.g., GPG Mail).

The RSPG described in the present disclosure additionally provides several technical advancements and/or improvements over conventional REST clients configured to execute REST API transactions against a REST endpoint. For instance, in certain embodiments, the RSPG may be configured with capabilities to direct a REST API call to multiple different endpoints by extracting information identifying the different endpoints from a data field (for e.g., a recipient field) of an email message composed using standard email addressing semantics. The RSPG is then configured to construct a REST API call directed to each endpoint using the extracted information and simultaneously deliver the REST API call to each of the target endpoints. Instead of a user having to compose individual REST API calls directed to multiple different endpoints using a traditional REST client, by using the new and improved architecture provided by the RSPG, a user now needs to only compose a single email message using SMTP semantics that is directed to multiple recipients. The RSPG can then translate the email message into individual REST calls to be simultaneously delivered to the identified endpoints. This results in more efficient utilization of resources for performing REST transactions.

In addition, by using the RSPG described in the present disclosure, an email message identifying REST related information that is composed using SMTP semantics can be transmitted across multiple hops (e.g., via multiple Relay MTAs) provided by an underlying message distribution network (e.g., EMDN) without having to be encrypted or decrypted at each hop, even if the SMTP message body is encrypted at one end. In contrast, a REST API call that is accessed using a traditional REST client that has to go through multiple proxy servers (i.e., multiple hops) prior to reaching its destination has to be encrypted and decrypted at each hop. This requires the REST APIs typically to have extended HTTP usage headers to include numerous custom headers and other functionality which makes leveraging the APIs directly from a REST client additionally challenging.

The term cloud service is generally used to refer to a service that is made available by a cloud services provider (CSP) to users or customers on demand (e.g., via a subscription model) using systems and infrastructure (cloud infrastructure) provided by the CSP. Typically, the servers and systems that make up the CSP's infrastructure are separate from the customer's own on premise servers and systems. Customers can thus avail themselves of cloud services provided by the CSP without having to purchase separate hardware and software resources for the services. Cloud services are designed to provide a subscribing customer easy, scalable access to applications and computing resources without the customer having to invest in procuring the infrastructure that is used for providing the services.

There are several cloud service providers that offer various types of cloud services. There are various different types or models of cloud services including Software-as-a-Service (SaaS), Platform-as-a-Service (PaaS), Infrastructure-as-a-Service (IaaS), and others.

A customer can subscribe to one or more cloud services provided by a CSP. The customer can be any entity such as an individual, an organization, an enterprise, and the like. When a customer subscribes to or registers for a service provided by a CSP, a tenancy or an account is created for that customer. The customer can then, via this account, access the subscribed-to one or more cloud resources associated with the account.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 6:
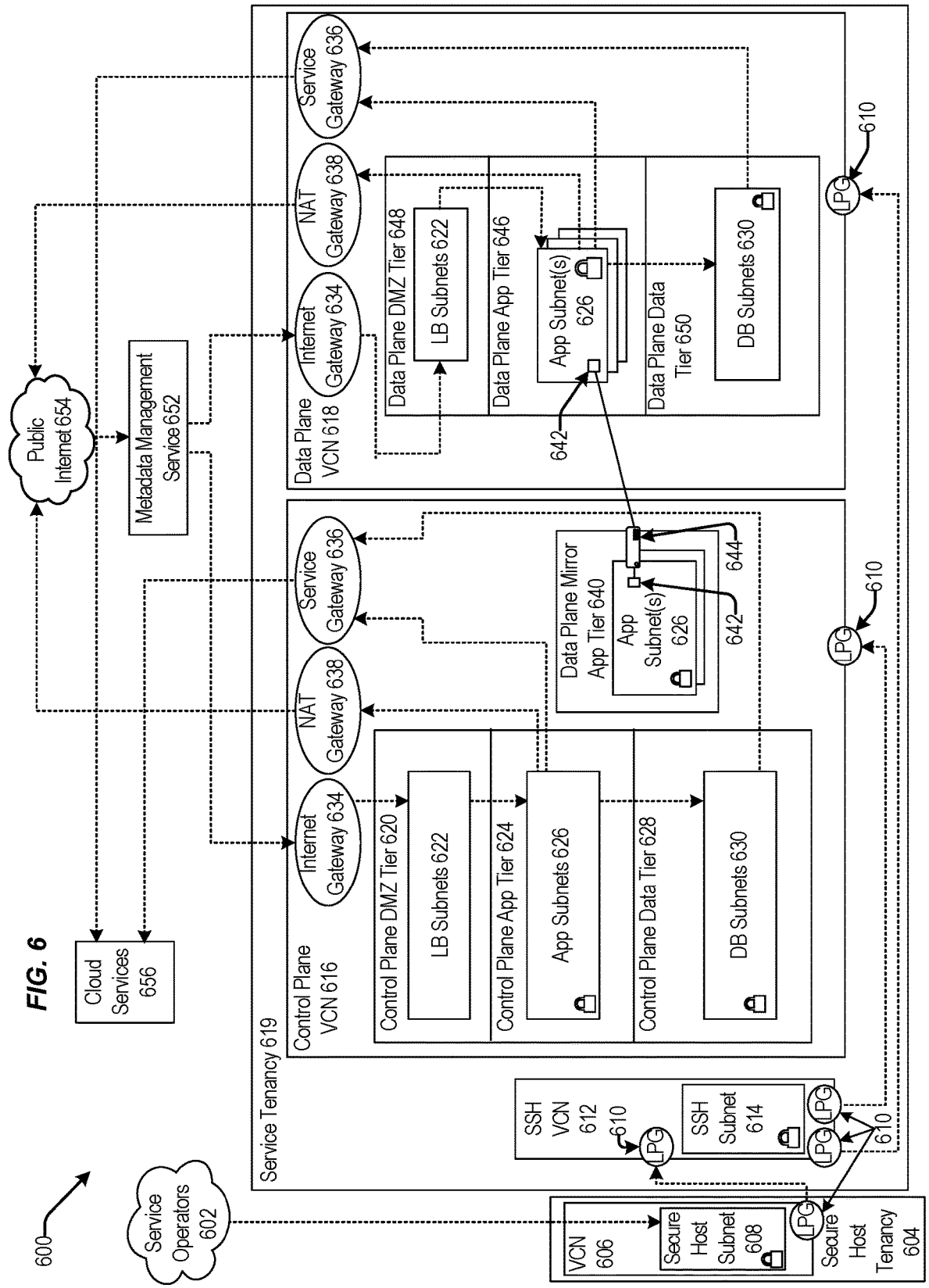
FIG. 6 is a block diagram illustrating an example pattern of an IaaS architecture, according to at least one embodiment.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep breaches contained. Additionally, the DMZ tier 620 can include one or more load balancer (LB) subnet(s) 622, a control plane app tier 624 that can include app subnet(s) 626, a control plane data tier 628 that can include database (DB) subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646.

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively couple to cloud services 656.

In some examples, the service gateway 636 of the control plane VCN 616 or of the data plane VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Memory that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of threat prevention, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

Figure 7:
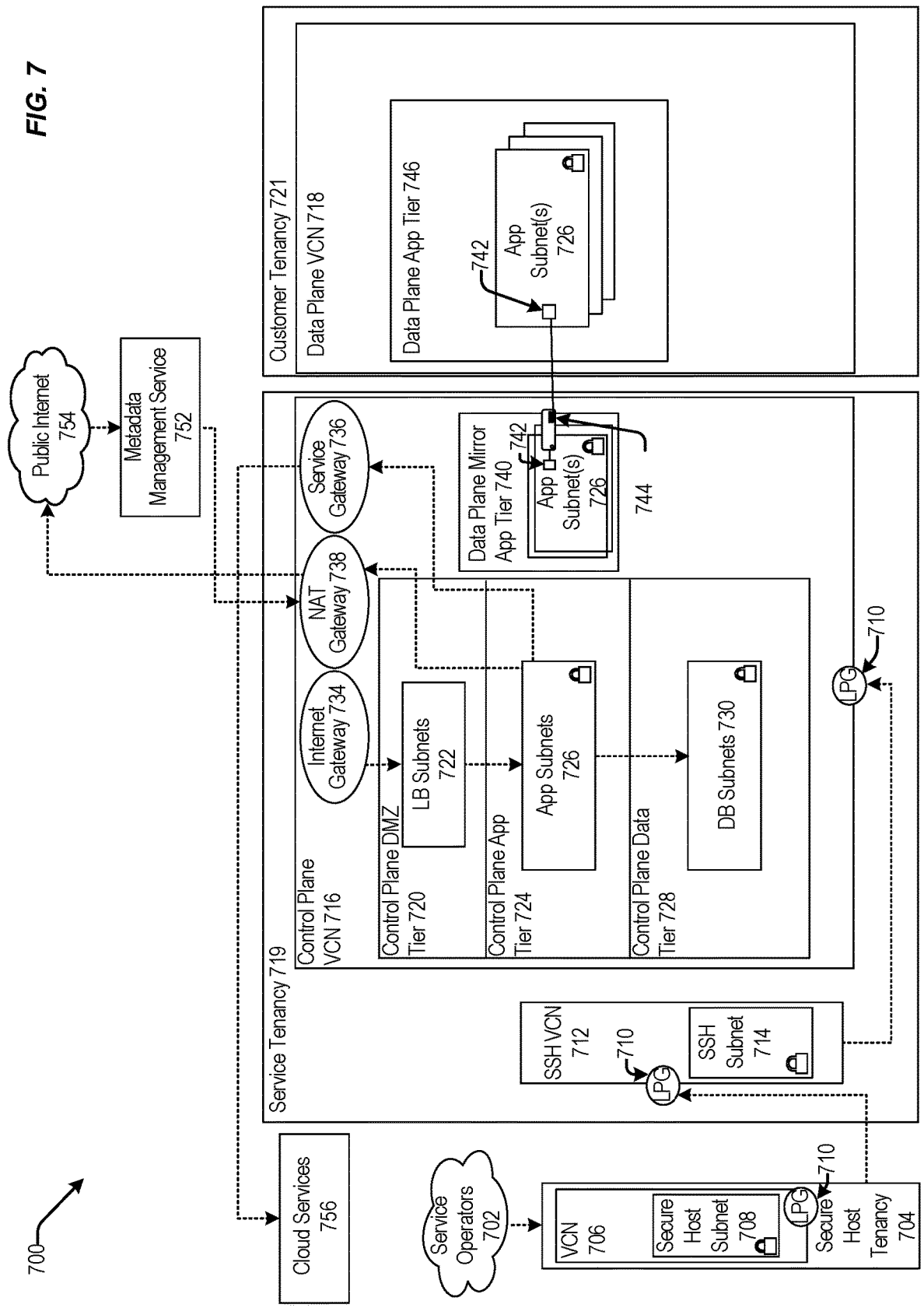
FIG. 7 is a block diagram illustrating another example pattern of an IaaS architecture, according to at least one embodiment.

FIG. 7 is a block diagram 700 illustrating another example pattern of an IaaS architecture, according to at least one embodiment. Service operators 702 (e.g. service operators 602 of FIG. 6) can be communicatively coupled to a secure host tenancy 704 (e.g. the secure host tenancy 604 of FIG. 6) that can include a virtual cloud network (VCN) 706 (e.g. the VCN 606 of FIG. 6) and a secure host subnet 708 (e.g. the secure host subnet 608 of FIG. 6). The VCN 706 can include a local peering gateway (LPG) 710 (e.g. the LPG 610 of FIG. 6) that can be communicatively coupled to a secure shell (SSH) VCN 712 (e.g. the SSH VCN 612 of FIG. 6) via an LPG 610 contained in the SSH VCN 712. The SSH VCN 712 can include an SSH subnet 714 (e.g. the SSH subnet 614 of FIG. 6), and the SSH VCN 712 can be communicatively coupled to a control plane VCN 716 (e.g. the control plane VCN 616 of FIG. 6) via an LPG 710 contained in the control plane VCN 716. The control plane VCN 716 can be contained in a service tenancy 719 (e.g. the service tenancy 619 of FIG. 6), and the data plane VCN 718 (e.g. the data plane VCN 618 of FIG. 6) can be contained in a customer tenancy 721 that may be owned or operated by users, or customers, of the system.

The control plane VCN 716 can include a control plane DMZ tier 720 (e.g. the control plane DMZ tier 620 of FIG. 6) that can include LB subnet(s) 722 (e.g. LB subnet(s) 622 of FIG. 6), a control plane app tier 724 (e.g. the control plane app tier 624 of FIG. 6) that can include app subnet(s) 726 (e.g. app subnet(s) 626 of FIG. 6), a control plane data tier 728 (e.g. the control plane data tier 628 of FIG. 6) that can include database (DB) subnet(s) 730 (e.g. similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g. the Internet gateway 634 of FIG. 6) that can be contained in the control plane VCN 716, and the app subnet(s) 726 can be communicatively coupled to the DB subnet(s) 730 contained in the control plane data tier 728 and a service gateway 736 (e.g. the service gateway of FIG. 6) and a network address translation (NAT) gateway 738 (e.g. the NAT gateway 638 of FIG. 6). The control plane VCN 716 can include the service gateway 736 and the NAT gateway 738.

The control plane VCN 716 can include a data plane mirror app tier 740 (e.g. the data plane mirror app tier 640 of FIG. 6) that can include app subnet(s) 726. The app subnet(s) 726 contained in the data plane mirror app tier 740 can include a virtual network interface controller (VNIC) 742 (e.g. the VNIC of 642) that can execute a compute instance 744 (e.g. similar to the compute instance 644 of FIG. 6). The compute instance 744 can facilitate communication between the app subnet(s) 726 of the data plane mirror app tier 740 and the app subnet(s) 726 that can be contained in a data plane app tier 746 (e.g. the data plane app tier 646 of FIG. 6) via the VNIC 742 contained in the data plane mirror app tier 740 and the VNIC 742 contained in the data plane app tier 746.

The Internet gateway 734 contained in the control plane VCN 716 can be communicatively coupled to a metadata management service 752 (e.g. the metadata management service 652 of FIG. 6) that can be communicatively coupled to public Internet 754 (e.g. public Internet 654 of FIG. 6). Public Internet 754 can be communicatively coupled to the NAT gateway 738 contained in the control plane VCN 716. The service gateway 736 contained in the control plane VCN 716 can be communicatively couple to cloud services 756 (e.g. cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 6," may be located in Region 1 and in "Region 2." If a call to Deployment 6 is made by the service gateway 736 contained in the control plane VCN 716 located in Region 1, the call may be transmitted to Deployment 6 in Region 1. In this example, the control plane VCN 716, or Deployment 6 in Region 1, may not be communicatively coupled to, or otherwise in communication with, Deployment 6 in Region 2.

Figure 8:
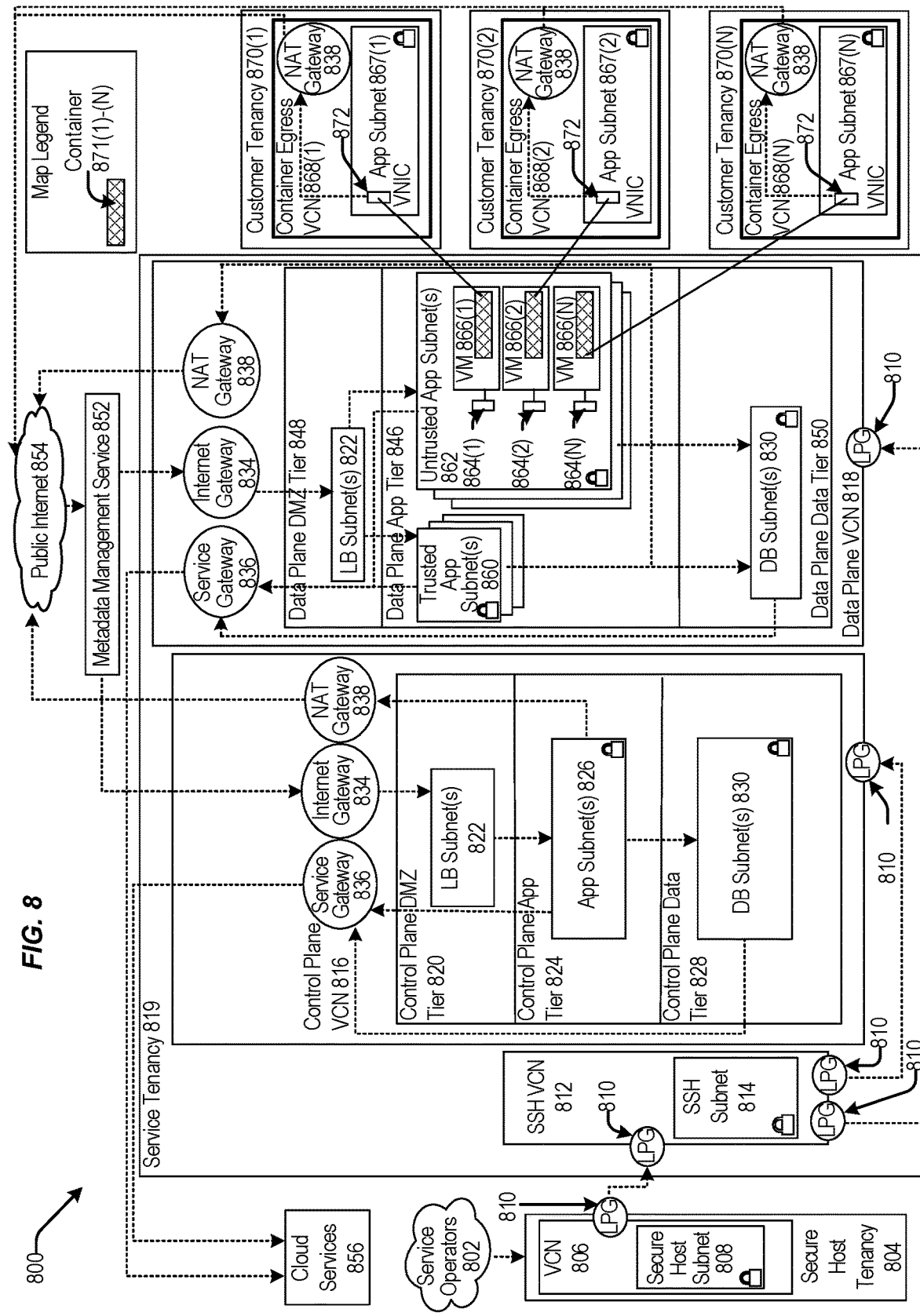
FIG. 8 is a block diagram illustrating another example pattern of an IaaS architecture, according to at least one embodiment.

FIG. 8 is a block diagram 800 illustrating another example pattern of an IaaS architecture, according to at least one embodiment. Service operators 802 (e.g. service operators 602 of FIG. 6) can be communicatively coupled to a secure host tenancy 804 (e.g. the secure host tenancy 604 of FIG. 6) that can include a virtual cloud network (VCN) 806 (e.g. the VCN 606 of FIG. 6) and a secure host subnet 808 (e.g. the secure host subnet 608 of FIG. 6). The VCN 806 can include an LPG 810 (e.g. the LPG 610 of FIG. 6) that can be communicatively coupled to an SSH VCN 812 (e.g. the SSH VCN 612 of FIG. 6) via an LPG 810 contained in the SSH VCN 812. The SSH VCN 812 can include an SSH subnet 814 (e.g. the SSH subnet 614 of FIG. 6), and the SSH VCN 812 can be communicatively coupled to a control plane VCN 816 (e.g. the control plane VCN 616 of FIG. 6) via an LPG 810 contained in the control plane VCN 816 and to a data plane VCN 818 (e.g. the data plane 618 of FIG. 6) via an LPG 810 contained in the data plane VCN 818. The control plane VCN 816 and the data plane VCN 818 can be contained in a service tenancy 819 (e.g. the service tenancy 619 of FIG. 6).

The control plane VCN 816 can include a control plane DMZ tier 820 (e.g. the control plane DMZ tier 620 of FIG. 6) that can include load balancer (LB) subnet(s) 822 (e.g. LB subnet(s) 622 of FIG. 6), a control plane app tier 824 (e.g. the control plane app tier 624 of FIG. 6) that can include app subnet(s) 826 (e.g. similar to app subnet(s) 626 of FIG. 6), a control plane data tier 828 (e.g. the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g. the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g. the service gateway of FIG. 6) and a network address translation (NAT) gateway 838 (e.g. the NAT gateway 638 of FIG. 6). The control plane VCN 816 can include the service gateway 836 and the NAT gateway 838.

The data plane VCN 818 can include a data plane app tier 846 (e.g. the data plane app tier 646 of FIG. 6), a data plane DMZ tier 848 (e.g. the data plane DMZ tier 648 of FIG. 6), and a data plane data tier 850 (e.g. the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCNs 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs 868(1)-(N). Each container egress VCNs 868(1)-(N) can include a NAT gateway 838 that can be communicatively coupled to public Internet 854 (e.g. public Internet 654 of FIG. 6).

The Internet gateway 834 contained in the control plane VCN 816 and contained in the data plane VCN 818 can be communicatively coupled to a metadata management service 852 (e.g. the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N) running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

Figure 9:
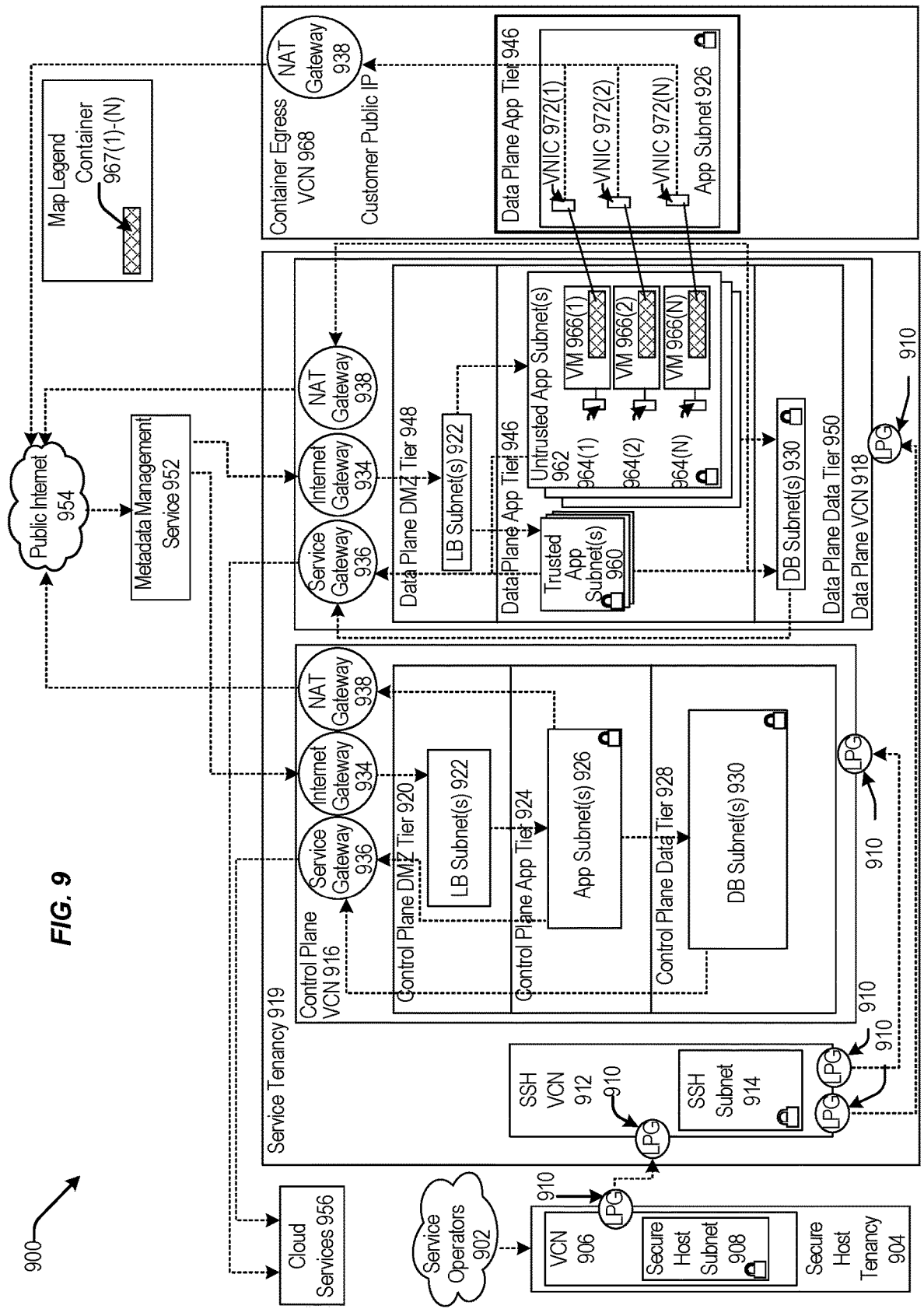
FIG. 9 is a block diagram illustrating another example pattern of an IaaS architecture, according to at least one embodiment.

FIG. 9 is a block diagram 900 illustrating another example pattern of an IaaS architecture, according to at least one embodiment. Service operators 902 (e.g. service operators 602 of FIG. 6) can be communicatively coupled to a secure host tenancy 904 (e.g. the secure host tenancy 604 of FIG. 6) that can include a virtual cloud network (VCN) 906 (e.g. the VCN 606 of FIG. 6) and a secure host subnet 908 (e.g. the secure host subnet 608 of FIG. 6). The VCN 906 can include an LPG 910 (e.g. the LPG 610 of FIG. 6) that can be communicatively coupled to an SSH VCN 912 (e.g. the SSH VCN 612 of FIG. 6) via an LPG 910 contained in the SSH VCN 912. The SSH VCN 912 can include an SSH subnet 914 (e.g. the SSH subnet 614 of FIG. 6), and the SSH VCN 912 can be communicatively coupled to a control plane VCN 916 (e.g. the control plane VCN 616 of FIG. 6) via an LPG 910 contained in the control plane VCN 916 and to a data plane VCN 918 (e.g. the data plane 618 of FIG. 6) via an LPG 910 contained in the data plane VCN 918. The control plane VCN 916 and the data plane VCN 918 can be contained in a service tenancy 919 (e.g. the service tenancy 619 of FIG. 6).

The control plane VCN 916 can include a control plane DMZ tier 920 (e.g. the control plane DMZ tier 620 of FIG. 6) that can include LB subnet(s) 922 (e.g. LB subnet(s) 622 of FIG. 6), a control plane app tier 924 (e.g. the control plane app tier 624 of FIG. 6) that can include app subnet(s) 926 (e.g. app subnet(s) 626 of FIG. 6), a control plane data tier 928 (e.g. the control plane data tier 628 of FIG. 6) that can include DB subnet(s) 930 (e.g. DB subnet(s) 830 of FIG. 8). The LB subnet(s) 922 contained in the control plane DMZ tier 920 can be communicatively coupled to the app subnet(s) 926 contained in the control plane app tier 924 and to an Internet gateway 934 (e.g. the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 6) and a network address translation (NAT) gateway 938 (e.g. the NAT gateway 638 of FIG. 6). The control plane VCN 916 can include the service gateway 936 and the NAT gateway 938.

The data plane VCN 918 can include a data plane app tier 946 (e.g. the data plane app tier 646 of FIG. 6), a data plane DMZ tier 948 (e.g. the data plane DMZ tier 648 of FIG. 6), and a data plane data tier 950 (e.g. the data plane data tier 650 of FIG. 6). The data plane DMZ tier 948 can include LB subnet(s) 922 that can be communicatively coupled to trusted app subnet(s) 960 (e.g. trusted app subnet(s) 860 of FIG. 8) and untrusted app subnet(s) 962 (e.g. untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g. public Internet 654 of FIG. 6).

The Internet gateway 934 contained in the control plane VCN 916 and contained in the data plane VCN 918 can be communicatively coupled to a metadata management service 952 (e.g. the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967(1)-(N) may be configured to make calls to respective secondary VNICs 972(1)-(N) contained in app subnet(s) 926 of the data plane app tier 946 that can be contained in the container egress VCN 968. The secondary VNICs 972(1)-(N) can transmit the calls to the NAT gateway 938 that may transmit the calls to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 10:
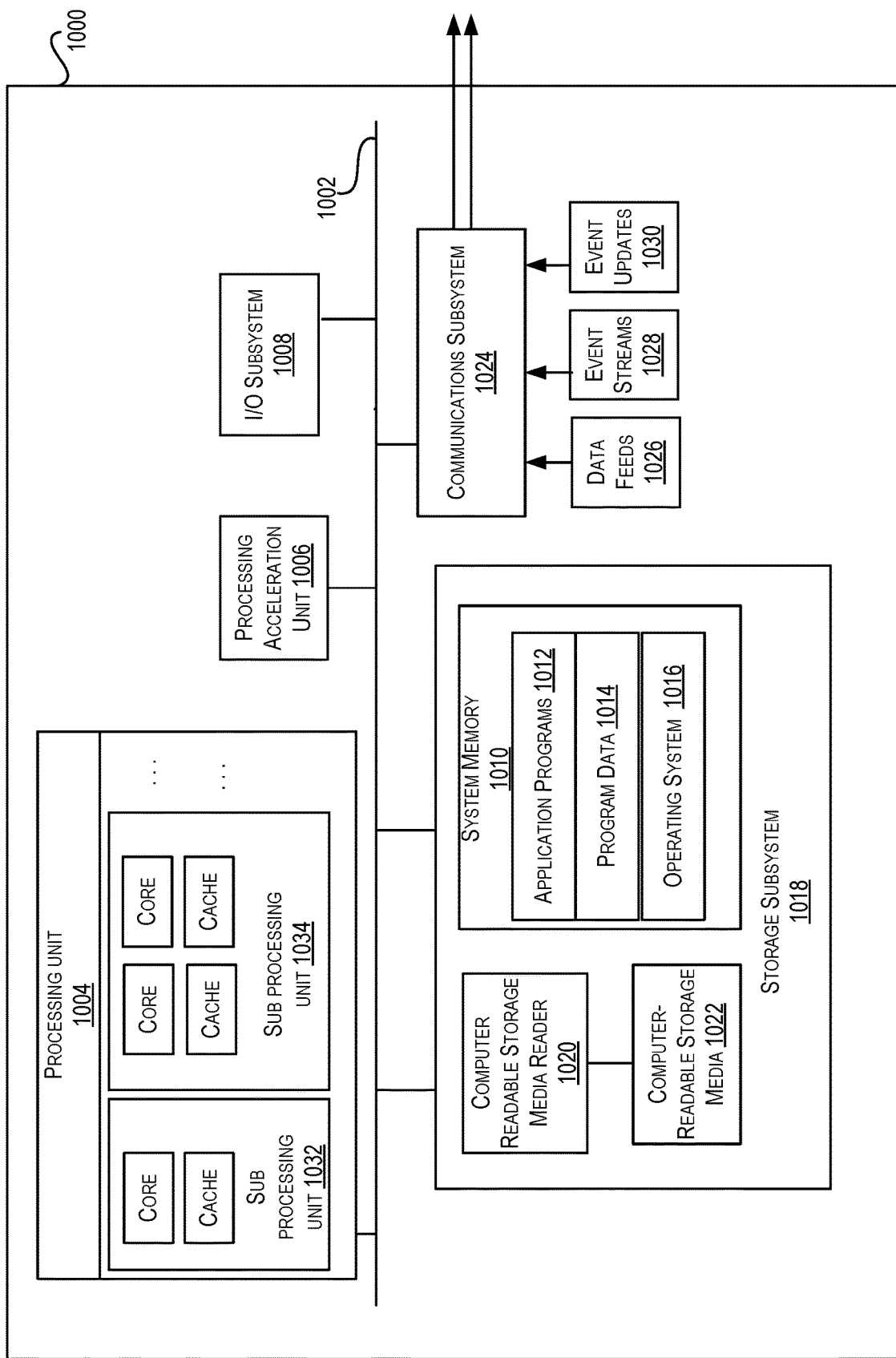
FIG. 10 illustrates an example computer system, in which various embodiments may be implemented.

FIG. 10 illustrates an example computer system 1000, in which various embodiments may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present disclosure.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
   for a first email message received by a Representational State Transfer (REST) Simple Message Transfer Protocol (SMTP) Protocol Gateway (RSPG), extracting, by the RSPG, information from one or more data fields of the received first email message for constructing a REST Application Programing Interface (API) call;
   constructing, by the RSPG, the REST Application Programming Interface (API) call based on the extracted information from the one or more data fields of the first email message, wherein the constructing comprises
   extracting first information from a first data field from the one or more data fields of the first email message, and
   using the first information to construct a first portion of a plurality of portions of the REST API call, the first portion corresponding to the first data field;
   invoking, by the RSPG, the REST API call against a REST endpoint;
   receiving, by the RSPG, a response generated from execution of the REST API call;
   generating, by the RSPG, a second email message based on the response; and
   causing, by the RSPG, the second email message to be communicated to an intended recipient of the response of the REST API call.

2. The method of claim 1, wherein extracting, by the RSPG, the first information from the first data field of the first email message comprises extracting the first information from a To field of the first email message, wherein extracting the first information from the To field comprises:
   extracting, from a Username portion of the To field of the first email message, the first information identifying the first portion of the REST API call, the first portion identifying the REST endpoint of the REST API call; and
   extracting, from a Domain Name portion of the To field of the first email message, the first information identifying the first portion of the REST API call, the first portion identifying the RSPG for accepting the first email message.

3. The method of claim 1, further comprising extracting, by the RSPG, second information from a second data field from the one or more data fields of the first email message, wherein extracting, by the RSPG, the second information from the second data field of the first email message comprises extracting the second information from a Subject field of the first email message, wherein extracting the second information from the Subject field comprises:
   extracting, from the Subject field, the second information identifying a second portion of the plurality of portions of the REST API call, the second portion identifying an action to be performed by the REST API call;
   extracting, from the Subject field, the second information identifying the second portion of the REST API call, the second portion identifying a pathname that uniquely identifies a resource to be accessed by the REST API call at the REST endpoint; and
   using the second information to construct the second portion of the REST API call.

4. The method of claim 1, further comprising:
   extracting, by the RSPG, third information from a third data field from the one or more data fields of the first email message, wherein extracting, by the RSPG, the third information from the third data field of the first email message further comprises extracting the third information from a body of the first email message, the third information identifying a third portion of the plurality of portions of the REST API call, the third portion identifying information associated with the action to be performed by the REST API call; and
   using the third information to construct the third portion of the REST API call.

5. The method of claim 1, wherein the response generated from execution of the REST API call comprises a response status code indicating that the REST API call was successfully executed by the REST endpoint.

6. The method of claim 1, wherein the response generated from execution of the REST API call comprises a response status code indicating that the REST API call failed to successfully execute at the REST endpoint.

7. The method of claim 1, wherein the response generated from execution of the REST API call comprises an intermediate response status code indicating that the REST API call is still being processed.

8. The method of claim 1, further comprising:
   determining, by the RSPG, that the response was not received from execution of the REST API call by the REST endpoint within a threshold period of time; and
   responsive to the determining, re-invoking, by the RSPG, the REST API call to the REST endpoint.

9. The method of claim 8, further comprising re-invoking the REST API call until a threshold condition is met or until the response is received from the REST endpoint.

10. The method of claim 1, further comprising:
   determining, by the RSPG, that the response received from the REST endpoint indicates unavailability of the REST endpoint; and
   responsive to the determining, re-invoking, by the RSPG, the REST API call against the REST endpoint.

11. A Representational State Transfer (REST) Simple Message Transfer Protocol (SMTP) Protocol Gateway (RSPG) comprising:
a memory; and
one or more processors configured to perform processing, the processing comprising:
for a first email message received by the RSPG, extracting, by the RSPG, information from one or more data fields of the received first email message for constructing a REST Application Programing Interface (API) call;
constructing, by the RSPG, the REST Application Programming Interface (API) call based on the extracted information from the one or more data fields of the first email message, wherein the constructing comprises
extracting first information from a first data field from the one or more data fields of the first email message, and
using the first information to construct a first portion of a plurality of portions of the REST API call, the first portion corresponding to the first data field;
invoking, by the RSPG, the REST API call against a REST endpoint;
receiving, by the RSPG, a response generated from execution of the REST API call;
generating, by the RSPG, a second email message based on the response; and
causing, by the RSPG, the second email message to be communicated to an intended recipient of the response of the REST API call.

12. The system of claim 11, wherein extracting, by the RSPG, the first information from the first data field of the first email message comprises extracting the first information from a To field of the first email message, wherein extracting the first information from the To field comprises:
extracting, from a Username portion of the To field of the first email message, the first information identifying the first portion of the REST API call, the first portion identifying the REST endpoint of the REST API call; and
extracting, from a Domain Name portion of the To field of the first email message, the first information identifying the first portion of the REST API call, the first portion identifying the RSPG for accepting the first email message.

13. The system of claim 11, further comprising extracting, by the RSPG, second information from a second data field from the one or more data fields of the first email message, wherein extracting, by the RSPG, the second information from the second data field of the first email message comprises extracting the second information from a Subject field of the first email message, wherein extracting the second information from the Subject field comprises:
extracting, from the Subject field, the second information identifying a second portion of the plurality of portions of the REST API call, the second portion identifying an action to be performed by the REST API call;
extracting, from the Subject field, the second information identifying the second portion of the REST API call, the second portion identifying a pathname that uniquely identifies a resource to be accessed by the REST API call at the REST endpoint; and
using the second information to construct the second portion of the REST API call.

14. The system of claim 11, further comprising:
extracting, by the RSPG, third information from a third data field from the one or more data fields of the first email message, wherein extracting, by the RSPG, the third information from the third data field of the first email message further comprises extracting the third information from a body of the first email message, the third information identifying a third portion of the plurality of portions of the REST API call, the third portion identifying information associated with the action to be performed by the REST API call; and
using the third information to construct the third portion of the REST API call.

15. The system of claim 11, wherein the response generated from execution of the REST API call comprises a response status code indicating that the REST API call was successfully executed by the REST endpoint.

16. The system of claim 11, further comprising:
determining, by the RSPG, that the response was not received from execution of the REST API call by the REST endpoint within a threshold period of time; and
responsive to the determining, re-invoking, by the RSPG, the REST API call to the REST endpoint.

17. The system of claim 16, further comprising re-invoking the REST API call until a threshold condition is met or until the response is received from the REST endpoint.

18. A non-transitory computer-readable medium having program code that is stored thereon, the program code executable by one or more processing devices for performing operations comprising:
for a first email message received by a Representational State Transfer (REST) Simple Message Transfer Protocol (SMTP) Protocol Gateway (RSPG), extracting, by the RSPG, information from one or more data fields of the received first email message for constructing a REST Application Programing Interface (API) call;
constructing, by the RSPG, REST Application Programming Interface (API) call based on the extracted information from the one or more data fields of the first email message, wherein the constructing comprises
extracting first information from a first data field from the one or more data fields of the first email message, and
using the first information to construct a first portion of a plurality of portions of the REST API call, the first portion corresponding to the first data field;
invoking, by the RSPG, the REST API call against a REST endpoint;
receiving, by the RSPG, a response generated from execution of the REST API call;
generating, by the RSPG, a second email message based on the response; and
causing, by the RSPG, the second email message to be communicated to an intended recipient of the response of the REST API call.

19. The non-transitory computer-readable medium of claim 18, wherein extracting, by the RSPG, the first information from the first data field of the first email message comprises extracting the first information from a To field of the first email message, wherein extracting the first information from the To field comprises:
extracting, from a Username portion of the To field of the first email message, the first information identifying the first portion of the REST API call, the first portion identifying the REST endpoint of the REST API call; and extracting, from a Domain Name portion of the To field of the first email message, the first information identifying the first portion of the REST API call, the first portion identifying the RSPG for accepting the first email message.

20. The non-transitory computer-readable medium of claim 18, wherein the response generated from execution of the REST API call comprises an intermediate response status code indicating that the REST API call is still being processed.

\* \* \* \* \*